Oct. 20, 1964     A. A. BREWER     3,153,282
APPARATUS AND METHOD FOR OBTAINING AND CHECKING PROPER
CENTRIC RELATIONSHIP OF DENTURE BASE PLATES
Filed April 20, 1962     2 Sheets-Sheet 1
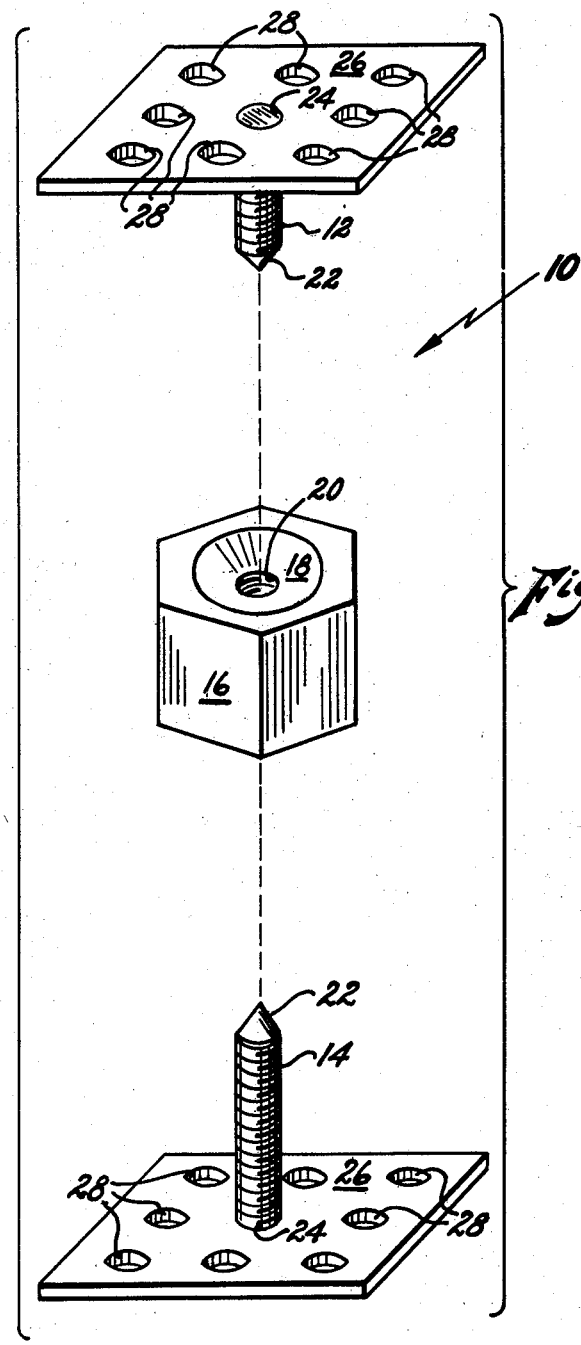
INVENTOR.
ALLEN A. BREWER
BY
ATTORNEYS

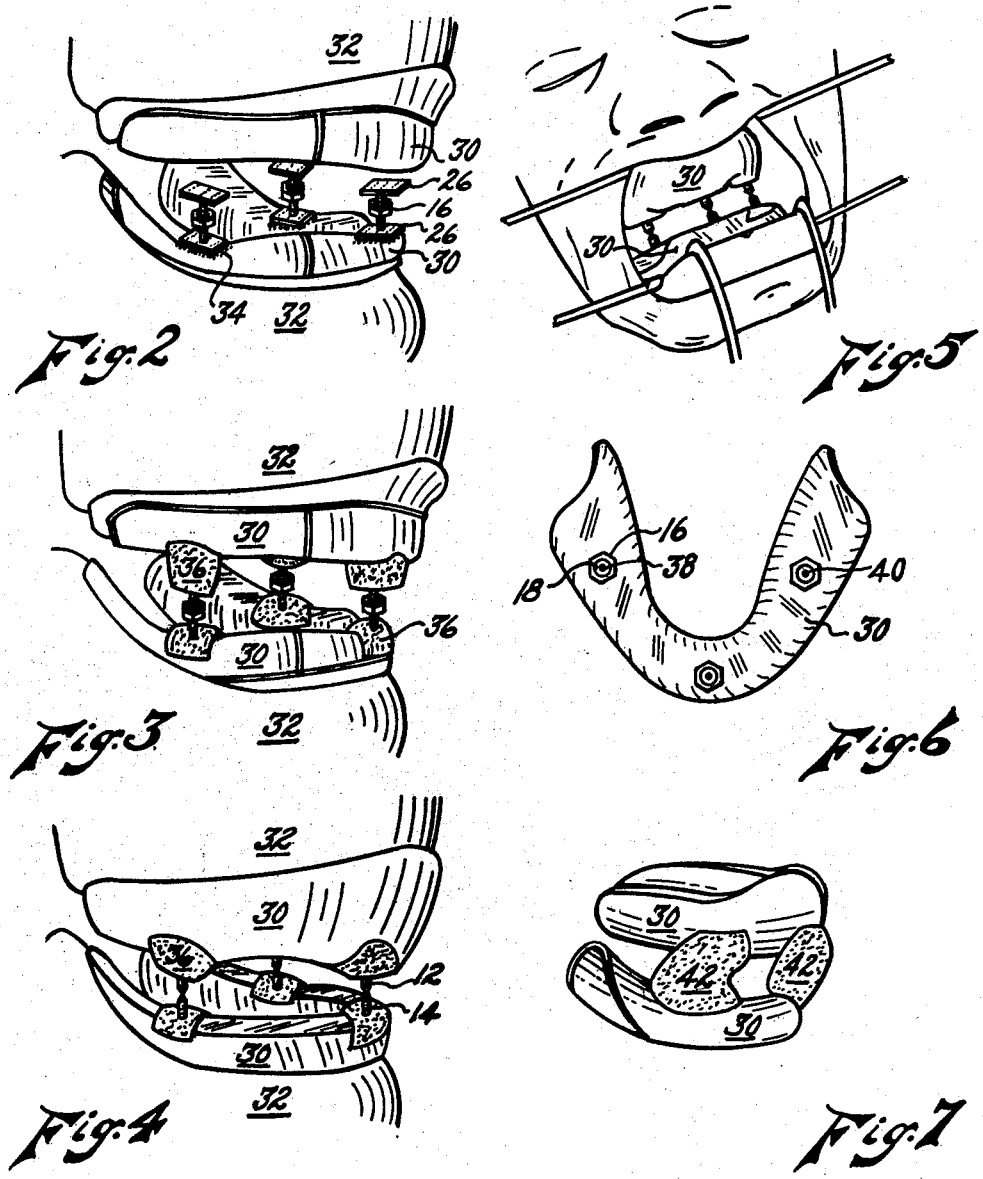

3,153,282
APPARATUS AND METHOD FOR OBTAINING AND CHECKING PROPER CENTRIC RELATIONSHIP OF DENTURE BASE PLATES
Allen A. Brewer, SAM 2317, Brooks A.F.B., San Antonio, Tex.
Filed Apr. 20, 1962, Ser. No. 189,219
8 Claims. (Cl. 32—19)
(Granted under Title 35, U.S. Code (1952), sec. 266)

The invention described herein may be manufactured and used by or for the United States Government for governmental purposes without payment to me of any royalty thereon.

This invention relates generally to artificial dentures, and more particulraly to a structure and technique or method for obtaining proper centric relationship in order to obtain proper centric occlusion.

In the preparation of artificial dentures, an impression is taken from the patient with a plastic material from which a positive model is made. Sometimes this process is varied or repeated as in the well-known double impression method. On the positive model a denture base is formed which requires an accurate maxillo-mandibular record of the centric relationship position for the construction of the complete dentures.

Unless the dentures, both upper and lower, are aligned in centric relation, centric occlusion is not possible. Improper centric relation and occlusion results in an imbalance which causes much discomfort to the patient. After obtaining the proper centric relationship, the base plates are utilized in an articulator which simulates the jaw movements of the patient with sufficient accuracy to enable proper mounting of the individual teeth such that the resultant dental plates, when worn by the patient, have the correct centric occlusion.

Of the various methods presently available to dentists for producing an accurate maxillo-mandibular record in the centric relationship position for the construction of complete dentures, the dentist may choose that which appeals to him. However, all methods have possibilities for error, and this invention provides for a method and apparauts for indicating the accuracy with which the centric relation has been obtained. Generally, an error in centric relation becomes apparent only after the teeth are set on the denture bases. This invention allows for a check of the centric relationship record and/or its subsequent transfer to an articulator. Thus, any errors present in the original relationship record, or errors which occur during the transfer to the articulator, may both be checked. The first step in checking is actually done when the denture bases are in the patient's mouth and, if error is apparent, this invention is utilized to obtain a new record. A subsequent rechecking would be continued until errors are eliminated.

Accordingly, it is an object of this invention to provide a method and apparatus for checking the centric relationship position.

It is another object of this invention to provide a method and apparatus suitable for checking maxillo-mandibular record in the centric relationship position which may be utilized both with an articulator and in the patient's mouth.

It is still another object of this invention to provide a simple and accurate check of centric relation.

It is a further object of this invention to provide a method and apparatus for checking centric relation, thereby providing for balanced occlusion in the resultant dentures.

It is a still further object of this inveniton to eliminate the necessity for arranging teeth on a denture base in order to observe the accuracy of record and transfer of the centric relation.

An additional object of this invention is to provide a reliable device and technique or method for reaccomplishing an erroneous record and/or transfer wherein the area of contact with the recording medium is minimized.

Another object of this invention is to provide a method and means for checking and correcting the centric relation and occlusion of a single denture which is utilized against an existing, opposed denture.

Still another object of this invention is to provide a method and apparatus utilized in the construction of complete dentures which effects a great saving in time and effort.

A still further object of this invention involves the provision of dental apparatus for checking centric relationship which utilizes standard materials which lend themselves to mass production manufacturing techniques.

These and other advantages, features and objects of the invention will become more apparent from the following description taken in connection with the illustrative embodiments in the accompanying drawings, wherein:

FIGURE 1 is an exploded view of the apparatus utilized in checking centric relationship;

FIGURES 2 through 7 show the various stages wherein the apparatus of FIGURE 1 is used in order to record and/or transfer and check centric relationship in the preparation of dental plates; and FIGURE 8 is a view in elevation of another embodiment of this invention.

Referring to FIGURE 1, there is shown an arrangement which is utilized to provide centric check. Each unit of centric check points 10 comprises opposing, threaded metal pins 12 and 14 and a hexagonal rod 16 which is hollowed out at one end at 18 to form a cup, and is provided with a threaded bore at 20 to receive each of the pins. Hexagonal rod is chosen to allow for the use of a wrench in places where there is not room for finger operation. The pins 12 and 14 may be manufactured of standard number 1 screws having 72 threads to the inch with one end 22 of each of the pins sharpened to a conical configuration in order to provide a point. The ends 24 of each of the pins, opposite the points 22, are conveniently secured to a square or rectangular plate 26, for example, threadably engaged therewith and staked. The plates 26 are provided with perforations 28 in order to facilitate the fastening of the plate to the denture base. Although the pin and plate assemblies were described relative to the embodiment of FIGURE 1, it is contemplated that the plates may be of any desired shape and may be dished or hollowed to accommodate the heads of conventional screws used in the pins.

Since the centric relationship is three dimensional, three sets of opposed, metal, pointed pins are utilized in the checking procedure. After the casts with the denture bases are mounted on an articulator, the denture bases are freed from all recording materials and devices utilized in obtaining the maxillo-mandibular record in the centric relationship position. In FIGURES 2 through 7, the denture base is indicated at 30 while the positive model is indicated at 32.

The opposing metal pins are then affixed to the denture bases 30 in order to check the accuracy of the registration record and its transfer to the articulator. The pin and plate assemblies may be made such that a number of standard sizes, i.e., pin lengths, are stocked and supplied with a set. In addition, a set may be provided with a pair of hexagonal cups of different lengths in order to avoid increasing the vertical dimension of occlusion with small length pin assemblies. Generally, the maxillary arch will utilize a relatively short pin 12 of about 3.5 mm.

The short pin 12 has a connecting cup 16 screwed all the way thereon with the hollow portion 18 uppermost while the longer pin is then screwed into the other end of the connecting cup 16 which extends below pin 12 such that finger pressure indicates a point-to-point relationship. The assembled units of opposed metal points are positioned on the denture bases 30, which are on the articulator, with conventional utility wax 34 as illustrated in a partially assembled relationship in FIGURE 2. The length of the bottom pin 14 is dictated by the interridge spacing.

Artificial stone 36 is applied, as shown in FIGURE 3, over the perforated plates 26 in order to stabilize the pins on the denture bases 30. The perforations 28 aid in the secure attachment of the plates 26 to the denture bases 30. A covering of wax is then provided over the stone in order to complete the attachment of the pins to the denture bases.

The next step involves the removal of the connecting cup 16 by screwing it onto the longer pin 14, opening the articulator and screwing the cup 16 off the pin. The hollowed portion 18 facilitates the removal of pin 12 from the assembled unit. FIGURE 4 illustrates the articulator in its closed position, the cup 16 having been removed, wherein the three sets of opposed metal points are registered for a checking of the centric relationship.

As illustrated in FIGURE 5, placement of the dentures 30 in the patient's mouth and a recheck of the pins 12 and 14, show whether the points 22 come together in the mouth as they did on the articulator when the patient is taken to the centric relationship position. Proper mating of the points 22 indicates correctness of both the record and the transfer procedures, while deviation indicates an error or incorrectness.

In order to correct an error, the denture bases 30 are removed from the mouth, and a hexagonal cup 16 is screwed all the way down on the pins 14 on the mandibular arch. Wax or modeling plastic 38 is then placed and heated in the hollowed portions 18 of the cups 16, as shown in FIGURE 6, and provides the registration material for the following check. Both the maxillary and mandibular denture bases 30 are placed in the patient's mouth, and, as the patient is taken to the centric relationship position, the jaws are brought together until the pins on the one base make equal and simultaneous minimum indentations in the wax or modeling plastic 38 in the opposing cups. Repeated closings must follow into the same indentations 40.

The denture bases are next removed from the patient's mouth and related to one another via the pins on one base and the indentations in the cups on the opposite base. The bases are then luted together with a quick setting artificial stone as shown at 42 in FIGURE 7. Replacement of the denture base casts in the articulator now provides a new relationship record and transfer. Removal of the luting stone 42 and resetting of either the maxillary or mandibular pins, as was described relative to FIGURES 2 and 3, would start the procedure again until no error is apparent.

The embodiment of FIGURE 8 is utilized to check the relationship record and transfer when a new denture is made for one arch which is opposed by an existing denture on the opposite arch. In this embodiment the plates 26 are oriented in other than an orthogonal relationship with respect to the pins. One method for forming the attachment of the two elements is to modify the slot in the head of a machine screw such that the plate may be secured therein in a conventional manner at a 30° angle to the longitudinal axis of the pin. With this arrangement, the perforated attaching plates are placed on the lingual or buccal and labial flange opposite the teeth of the existing denture, thereby providing room for pins in the interocclusal space. The succeeding operations in performing the technique of this invention would then conform to that described relative to the embodiment of FIGURE 1.

While applicant does not intend to be limited to any particular shapes or sizes of parts in the embodiments just described, there follows a set of stock sizes which have been found to be particularly suitable for the elements to provide a complete set capable of supplying the needs for most conditions of use. The cups are provided in 4 mm. and 5.6 mm. lengths while the pins are provided in 3.5 mm., 4.2 mm. and 7.0 mm. lengths on a 10.3 mm. x 10.3 mm. plate.

Although the invention has been described with reference to particular embodiments, it will be understood to those skilled in the art that the invention is capable of a variety of alternative embodiments within the spirit and scope of the appended claims.

I claim:

1. Dental apparatus for obtaining and checking the maxillo-mandibular record of the centric relationship position comprising, a pair of pins, said pins having conical points at one end, the remainder of said pins being cylindrical and externally threaded, a separate plate secured to each of said pins opposite said pointed ends, and a hexagonal rod, a tapered bore extending for a short distance along the axis of said rod, a threaded bore along said axis and intersecting with said tapered bore for mating with the threads on said pins, said hexagonal rod being removably mounted on said pins.

2. Apparatus as defined in claim 1 wherein said plates to which said pins are secured are orthogonally related to said pins.

3. Apparatus as defined in claim 1 wherein said plates to which said pins are secured are other than orthogonally related to said pins.

4. An instrument for use in the manufacture of artifical dentures to establish, record and check the centric relationship position, said instrument comprising a pair of mutually opposed cylindrical pins having points at the mutually opposed ends of said pins, a separate plate secured to each of said pins at the end of each pin opposite its point, an external thread along said pins from said plates to said points, internally threaded means of a length sufficient to engage both of said pins when they are in said mutually opposed, contacting relationship, and a hollowed portion at one end of said last-mentioned means concentric with said internal thread, said internally threaded means being removably mounted on the axis of said pins.

5. An instrument as defined in claim 4 wherein said plates to which said pins are secured are orthogonally related to said pins.

6. An instrument as defined in claim 4 wherein said plates to which the pins are secured are other than orthogonally related to said pins.

7. A method for checking the record and transfer of the centric relationship position of denture bases comprising, securing a series of opposed pairs of pins having points at one end thereof on the upper and lower denture bases in an assumed centric relation such that said points are in contact with one another, inserting said denture bases in a patient's mouth, and causing the patient to assume the centric relationship position such that the position of said points in contact with each other indicates correctness of both the record and transfer procedures while deviation of said points indicate error or incorrectness.

8. A method as defined in claim 7 including the steps of applying a plastic material to the free end of one of each pair of opposed pins on said denture bases, causing the patient to assume the centric relationship position to cause the points on the pins of one base to make equal and simultaneous minimum indentations in said plastic material, removing the detnure bases from the patient's mouth, luting said bases together in the recorded centric relationship position, replacing one pin of each of said mutually opposed pairs of pins such that said points are again in mutually opposed relationship to enable re-checking said denture bases in the patient's mouth.

References Cited in the file of this patent

UNITED STATES PATENTS

| | | |
|---|---|---|
| 2,183,512 | Brenner | Dec. 12, 1939 |
| 2,252,426 | Gifford | Aug. 12, 1941 |
| 2,481,203 | Davies et al. | Sept. 6, 1949 |
| 2,746,150 | Needles | May 22, 1956 |